US012705616B2

(12) United States Patent
Koppel et al.

(10) Patent No.: US 12,705,616 B2
(45) Date of Patent: Aug. 11, 2026

(54) METHODS, SYSTEMS, AND DEVICES FOR COMPUTING SYSTEMS IMPROVING RENDERING OF ELECTRONIC PAYMENTS

(71) Applicant: JPMorgan Chase Bank, N.A., New York, NY (US)

(72) Inventors: Alec Koppel, New York, NY (US); Yuchen Xiao, Jersey City, NJ (US); Annapoorani Lakshmi Narayanan, New York, NY (US); Parisa Hassanzadeh, San Jose, CA (US); Sumitra Ganesh, Short Hills, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 97 days.

(21) Appl. No.: 18/392,523

(22) Filed: Dec. 21, 2023

(65) Prior Publication Data

US 2025/0209454 A1 Jun. 26, 2025

(51) Int. Cl.
*G06Q 20/40* (2012.01)

(52) U.S. Cl.
CPC .................................. *G06Q 20/401* (2013.01)

(58) Field of Classification Search
CPC ............... G06Q 20/401; G06Q 20/206; G06Q 20/40145; G06Q 10/0635; G06Q 50/265; H04L 9/3247; G06F 21/57
USPC ......... 705/3, 7.29, 14.14, 16, 37, 44, 50, 51, 705/329; 707/E17.014; 709/229; 726/28; 718/104
See application file for complete search history.

(56) References Cited

U.S. PATENT DOCUMENTS 8,939,903 B2 * 1/2015 Roberts .................. G06N 3/006 705/7.29
2002/0010679 A1 * 1/2002 Felsher ............... G06F 21/6245 705/51
2008/0195482 A1 * 8/2008 Sailer ...................... G06F 40/58 705/14.14
2009/0287837 A1 * 11/2009 Felsher ............... G06F 21/6245 709/229
2010/0241595 A1 * 9/2010 Felsher .................. G16H 10/65 707/E17.014

(Continued)

*Primary Examiner* — Hani M Kazimi
*Assistant Examiner* — Sanjeev Malhotra
(74) *Attorney, Agent, or Firm* — Guntin & Gust, PLC; Atanu Das

(57) ABSTRACT

Aspects of the subject disclosure may include, for example, identifying source equipment is associated with a group of recipient equipment based on historical financial data, and determining a processing latency between the source equipment and each recipient equipment of the group of recipient equipment based on the historical financial data. Further embodiments can include determining a processing rate for each processing latency, and determining a verification latency to perform security authentication for each recipient equipment. Additional embodiments can include determining a verification rate for each verification latency, determining a service metric based on the processing rates and the verification rates, the service metric being associated with a token service that expedites a transfer of financial data between the source equipment and the group of recipient equipment, and presenting the service metric at the source equipment to enroll in the token service. Other embodiments are disclosed.

20 Claims, 11 Drawing Sheets

(56) References Cited

U.S. PATENT DOCUMENTS

2011/0264577 A1* 10/2011 Winbom ................ G06Q 40/04 705/37
2012/0303425 A1* 11/2012 Katzin ............... G06Q 20/4016 705/16
2013/0159021 A1* 6/2013 Felsher .................. G16H 10/60 705/3
2013/0262333 A1* 10/2013 Wicker .................. G06Q 10/00 705/325
2013/0290020 A1* 10/2013 Brush .................... G16H 10/60 705/3
2014/0222684 A1* 8/2014 Felsher .................. G16H 10/60 705/50
2014/0282586 A1* 9/2014 Shear .................... G06F 9/5072 718/104
2015/0127509 A1* 5/2015 Studnitzer .............. G06Q 40/04 705/37
2015/0310188 A1* 10/2015 Ford ..................... H04L 63/101 726/28
2016/0071111 A1* 3/2016 Wang ..................... G06V 40/45 705/44
2017/0041296 A1* 2/2017 Ford ....................... G06F 21/64
2018/0046518 A1* 2/2018 Shear .................... G06F 9/5072
2018/0159690 A1* 6/2018 Ramalingam ......... G06F 21/645
2018/0329744 A1* 11/2018 Shear .................... G06F 9/5072
2019/0222560 A1* 7/2019 Ford ..................... H04W 12/06
2020/0068075 A1* 2/2020 Russell ................. H04W 64/00
2020/0117690 A1* 4/2020 Tran ....................... G06Q 20/18
2020/0204527 A1* 6/2020 Vass .................... H04L 63/0428
2020/0322252 A1* 10/2020 Fargier .................... H04L 45/16
2021/0256070 A1* 8/2021 Tran .................... G06F 16/9536
2021/0279780 A1* 9/2021 Herken .............. G06Q 30/0601
2022/0342993 A1* 10/2022 Shear ...................... H04L 63/20
2023/0054446 A1* 2/2023 LaFever ................ H04W 12/75
2023/0186216 A1* 6/2023 Fortune .............. G06Q 10/0635 705/325
2023/0281713 A1* 9/2023 Studnitzer .............. G06Q 40/04 705/37
2023/0376926 A1* 11/2023 Richter ................ G06Q 20/206
2024/0045967 A1* 2/2024 Shear ...................... G06F 21/64
2024/0070774 A1* 2/2024 Herrera .................. G06Q 40/03
2024/0256336 A1* 8/2024 Shear .................... G06F 9/5072
2025/0013694 A1* 1/2025 Tran ..................... G06Q 20/321
2025/0053674 A1* 2/2025 Arriaga ................... G06F 16/26
2025/0124436 A1* 4/2025 Richter ................ G06Q 20/206

* cited by examiner

100

300

320

400

610

| Metrics evaluated test set | Pricing Scheme* | | | |
|---|---|---|---|---|
| | Projected Max | Breakeven | Conservative Projected Max $\eta$=1 | Conservative Projected Max $\eta$=2 |
| Token Price ($) | 0.58 | 0.0 | 0.46 | 0.34 |
| Fin Inst Gain ($) | 12.93±4.7 | 14.06±0.35 | 14.50±0.37 | 14.41±0.34 |
| Client Time Savings (per screened payment, hrs) | 10.60±3.92 | 12.01±0.29 | 12.02±0.28 | 12.04±0.28 |
| Client Enrollment | 57±49% | 100% | 100% | 100% |

METHODS, SYSTEMS, AND DEVICES FOR COMPUTING SYSTEMS IMPROVING RENDERING OF ELECTRONIC PAYMENTS

FIELD OF THE DISCLOSURE

The subject disclosure relates to methods, systems, and devices for computing systems improving rendering electronic payments.

BACKGROUND

Friction including processing delay and screening delay can cause undue degradation in the client/payor experience when the client/payor utilizes consumer banking services such as rendering electronic payments to beneficiaries. For example, a payor (e.g., business) may repetitively render electronic payments to a specific beneficiary (e.g., vendor). Further, for each electronic payment, the financial institution that facilitates the rendering of the electronic payment on behalf of the payor may incur processing delay and screening delay in the course of rendering each the electronic payment. In addition to degrading the payor user experience in rendering such repetitive electronic payments, the financial institution utilizes a significant amount of computer resources (e.g., computer processor and memory capacity) in screening the electronic payments.

BRIEF DESCRIPTION OF THE DRAWINGS

Reference will now be made to the accompanying drawings, which are not necessarily drawn to scale, and wherein:

FIG. 8 is a chart that illustrates aspects of different token pricing methodologies.

DETAILED DESCRIPTION

Figure 1:
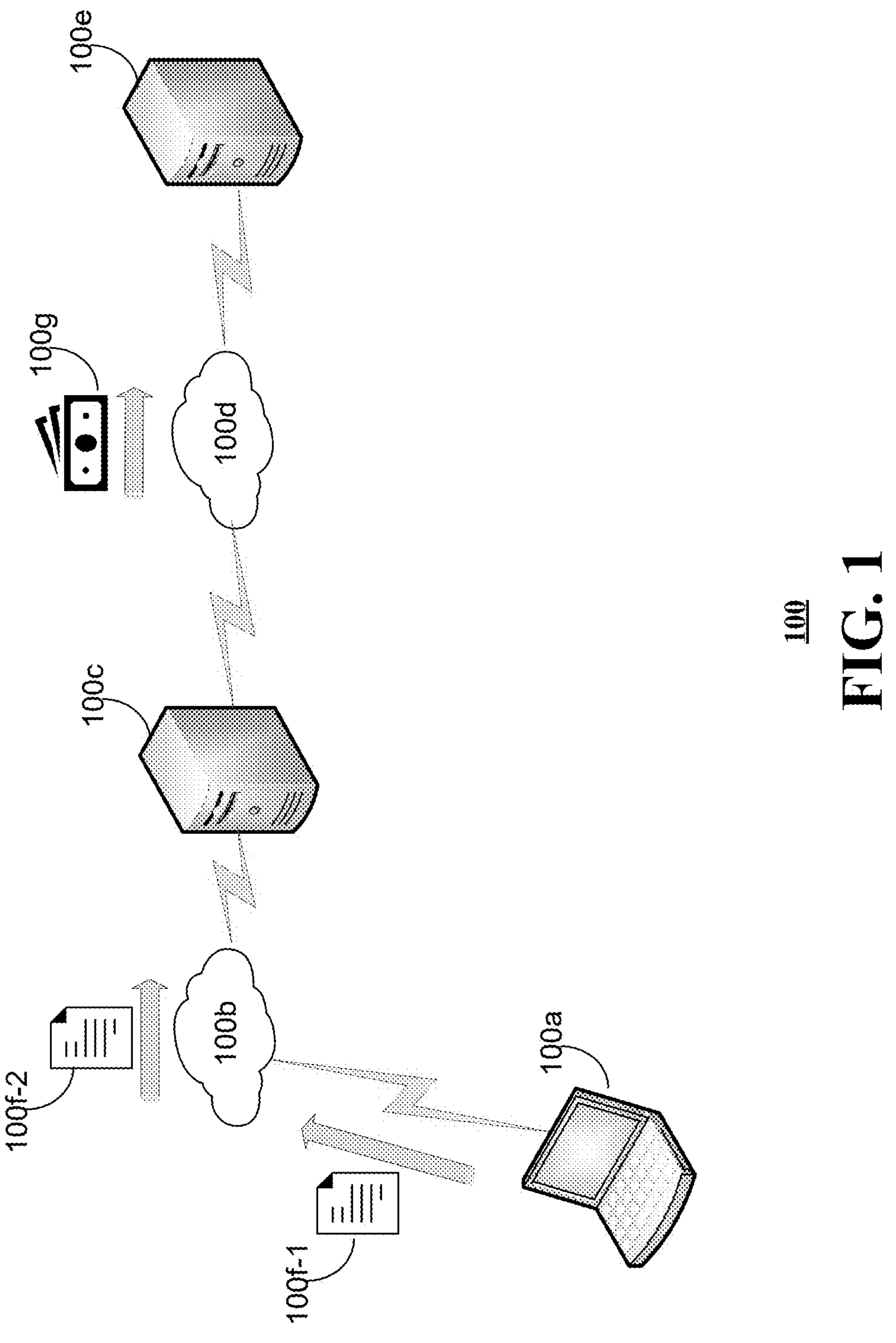
FIGS. 1, 2, 3A, 3B, 3C, and 4 depict illustrative embodiments of a block diagram of a system to efficiently render electronic payments in accordance with various aspects described herein.

The subject disclosure describes, among other things, illustrative embodiments for identifying source equipment is associated with a group of recipient equipment based on historical financial data exchanged between the source equipment and the group of recipient equipment, and determining a processing latency between the source equipment and each recipient equipment of the group of recipient equipment based on the historical financial data resulting in a group of processing latencies. Further embodiments can include determining a processing rate for each processing latency between the source equipment and each recipient equipment resulting in a group of processing rates, and determining a verification latency to perform security authentication for each recipient equipment of the group of recipient equipment resulting in a group of verification latencies. Additional embodiments can include determining a verification rate for each verification latency resulting in a group of verification rates, determining a service metric based on the group of processing rates and the group of verification rates, the service metric being associated with a token service that expediates a transfer of financial data between the source equipment and the group of recipient equipment, and presenting the service metric at the source equipment to enable enrollment of the source equipment to utilize the token service. Other embodiments are described in the subject disclosure.

One or more aspects of the subject disclosure include a device, comprising a processing system including a processor, and a memory that stores executable instructions that, when executed by the processing system, facilitate performance of operations. The operations can comprise identifying source equipment is associated with a group of recipient equipment based on historical financial data exchanged between the source equipment and the group of recipient equipment, and determining a processing latency between the source equipment and each recipient equipment of the group of recipient equipment based on the historical financial data resulting in a group of processing latencies. Further operations can comprise determining a processing rate for each processing latency between the source equipment and each recipient equipment resulting in a group of processing rates, and determining a verification latency to perform security authentication for each recipient equipment of the group of recipient equipment resulting in a group of verification latencies. Additional operations can comprise determining a verification rate for each verification latency resulting in a group of verification rates, determining a service metric based on the group of processing rates and the group of verification rates, the service metric being associated with a token service that expediates a transfer of financial data between the source equipment and the group of recipient equipment, and presenting the service metric at the source equipment to enable enrollment of the source equipment to utilize the token service.

One or more aspects of the subject disclosure include a non-transitory machine-readable medium, comprising executable instructions that, when executed by a processing system including a processor, facilitate performance of operations. The operations can comprise identifying source equipment is associated with a group of recipient equipment based on historical financial data exchanged between the source equipment and the group of recipient equipment, and determining a processing rate for each processing latency between the source equipment and each recipient equipment resulting in a group of processing rates. Further operations can comprise determining a verification rate for each verification latency resulting in a group of verification rates, determining a service metric based on the group of processing rates and the group of verification rates, the service metric being associated with a token service that expediates a transfer of financial data between the source equipment and the group of recipient equipment, and presenting the service metric at the source equipment to enable enrollment of the source equipment to utilize the token service.

One or more aspects of the subject disclosure include a method. The method can comprise identifying, by a server including a processor, source equipment is associated with a group of recipient equipment based on historical financial data exchanged between the source equipment and the group of recipient equipment, and determining, by the server, a processing latency between the source equipment and each recipient equipment of the group of recipient equipment based on the historical financial data resulting in a group of processing latencies. Further, the method can comprise determining, by the server, a processing rate for each processing latency between the source equipment and each recipient equipment resulting in a group of processing rates, and determining, by the server, a verification latency to perform security authentication for each recipient equipment of the group of recipient equipment resulting in a group of verification latencies. In addition, the method can comprise determining, by the server, a verification rate for each verification latency resulting in a group of verification rates, determining, by the server, a service metric based on the group of processing rates and the group of verification rates, the service metric being associated with a token service that expediates a transfer of financial data between the source equipment and the group of recipient equipment, and presenting, by the server, the service metric at the source equipment to enable enrollment of the source equipment to utilize the token service. Also, the method can comprise receiving, by the server, a request to transfer the financial data from the source equipment over a communication network, and transferring, by the server, over the communication network, the financial data to the recipient equipment over the communication network based on enrollment in the token service.

FIGS. 1, 2, 3A, 3B, 3C, and 4 depict illustrative embodiments of a block diagram of a system to efficiently render electronic payments in accordance with various aspects described herein.

In one or more embodiments, friction including processing delays and screening delays in rendering electronic payments by financial institutions can cause undue degradation in client/payor experience. Further embodiments include a wholesale electronic payments token to efficiently expedite processing electronic payments between a payor and a beneficiary. Additional embodiments allow clients to enroll in a token service for an enrollment fee that provides a program to undergo periodic pre-screenings in an offline fashion to prevent repetitive real-time screenings for high volume electronic payment transactions between a payor and beneficiary. In doing so, the financial institution saves on operational costs (e.g., utilizing computer processing and memory capacity more efficiently) associated with conducting electronic payment screenings. Some embodiments can include a pricing engine for such a token calibrated to or based on the costs of different electronic payment screening types, the volume of electronic payments, and the utility a payor assigns to electronic payment delays. The development of the token price includes a formulation as a bilevel stochastic optimization problem: the inner objective in which it is determined that the token price is defined as the value to the financial institution as a function of processing and screening costs as well as electronic payment volume, which are treated as random processes that depend on a payor's electronic payment transaction history over a time-interval; and the outer objective where the payor determines whether to enroll in the token service is the value to the payor as a function of processing fees, the token price, and the utility of expedited versus routine electronic payment processing times.

One or more embodiments include a pricing strategy based on a certain payor utility hypothesis that allows a time-to-money conversion, and threshold conditions on when the cost reduction to the financial institution associated with electronic payment screenings are projected to be positive. Based on this pricing strategy, additional embodiments include a code architecture based on Python scripts for ingesting large-scale transactions data (e.g., electronic payment transaction history) evaluated at the level of client-beneficiary pairs, to calibrate/determine the price for each client's enrollment fee for the token service.

Referring to FIG. 1, in one or more embodiments, system 100 can facilitate rendering of electronic payments between a payor and beneficiary by a financial institution. In addition, system 100 can include a payor communication device 100*a* communicatively coupled to a financial institution server 100*c* over a communication network 100*b*. Further, the system 100 can include the financial institution server 100*c* communicatively coupled to a beneficiary server 100*e* over a communication network 100*d*. Communication device 100*a* can include a laptop computer, desktop computer, tablet computer, mobile phone, smartphone, or any other communication device that can access financial software application to facilitate rendering electronic payments between the payor and the beneficiary by the financial institution. Each of financial institution server 100*c* and beneficiary server 100*e* can include one or more servers in one location or spanning multiple locations, one or more virtual servers in one location or spanning multiple locations, and/or one or more cloud servers. Each of communication network 100*b* and communication network 100*d* can comprise a wireless communication network, wired communication network, or a combination thereof. In some embodiments, communication network 100*b* and communication network 100*d* can be portions of the same communication network. Note, in some embodiments, the beneficiary server can be operated by a financial institution associated with the beneficiary.

In one or more embodiments, payor personnel can provide electronic payment instructions 100*f*-1 to render electronic payment to the beneficiary by the financial institution utilizing the financial software application. The electronic payment instructions 100*f*-2 can travel across the communication network 100*b* to the financial institution server 100*c*. Further, financial institution server 100*c* can render electronic payment 100*g* over communication network 100*d* from a financial account of the payor to the financial account of the beneficiary server 100*e*. The financial institution server 100*c* can operate a financial account associated with the payor and the beneficiary server 100*e* can operate a financial account associated with the beneficiary.

Figure 2:
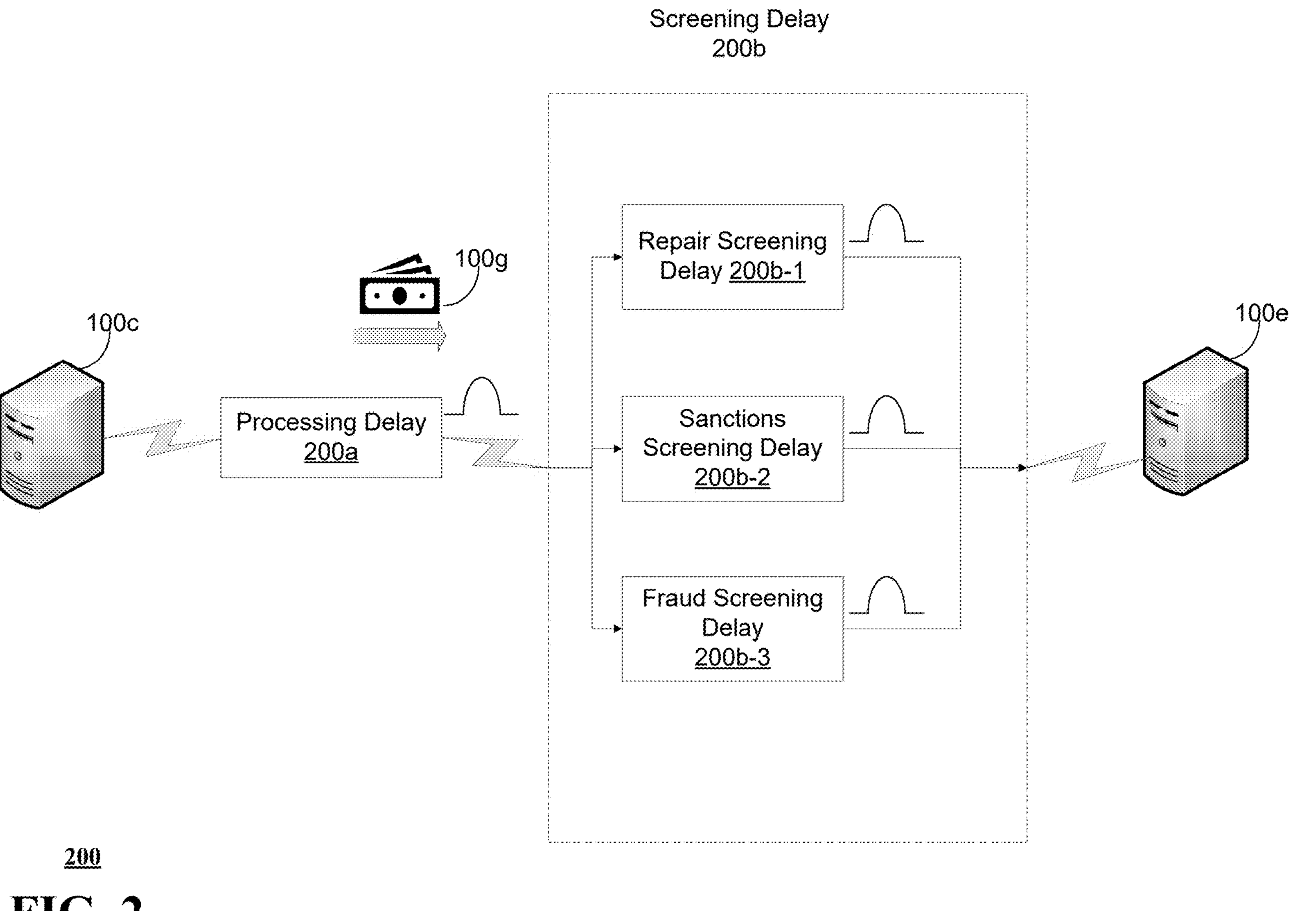

Referring to FIG. 2, in one or more embodiments, system 200 illustrates rendering electronic payment 100*g* between the financial institution server 100*c* and beneficiary server 100*e*. This can include incurring processing delay 200*a*. That is, processing delay 200*a* can include the delay to check the balance of the payor financial account to verify it has sufficient funds to render electronic payment 100*g* to the beneficiary. Further, the processing delay can include looking up the routing number and/or account number of the beneficiary and determining processing delay in rendering the electronic payment to the financial institution associated with the beneficiary based on the routing number and account number. In addition, the processing delay can include utilizing a rendering electronic payment service (e.g., wire, ACH, etc.). In further embodiments, the rendering of electronic payment 100*g* can include incurring screening delay 200*b*. Further, screening delay 200*b* can include repair screening delay 200*b*-1, sanctions screening delay 200*b*-2, and/or fraud screening delay. The financial institution server 100*c* can determine each of processing delay, processing cost, screening delay, and screening cost by based on the electronic payment transaction history associated with the payor and the beneficiary. The electronic payment transaction history can be stored and accessible by the financial institution server 100*c*.

Figure 3A:
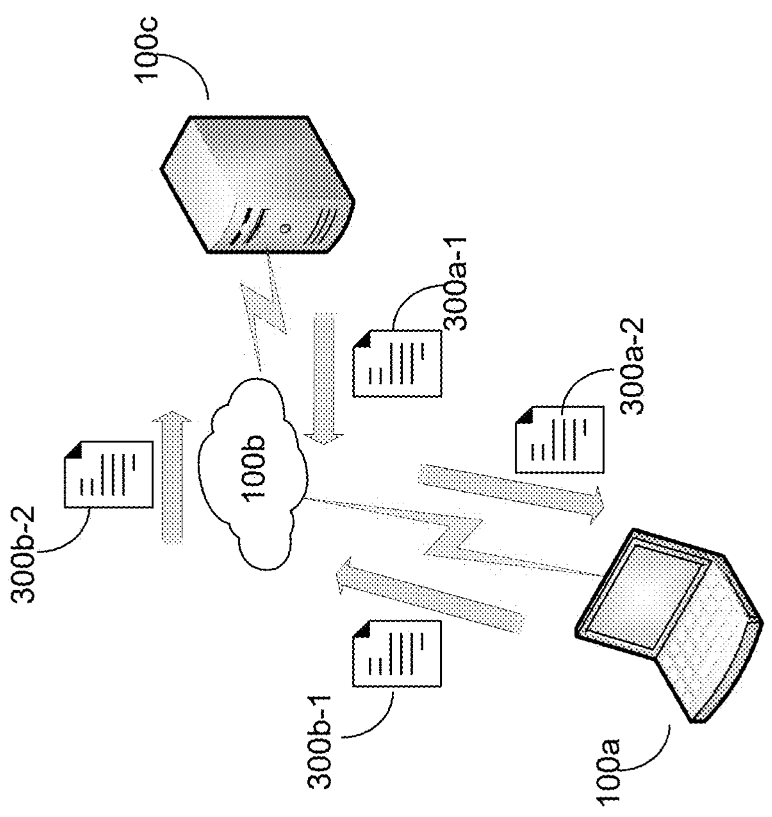

Referring to FIG. 3A, in one or more embodiments, the processing delay 200*a* is associated with a processing cost and the screening delay is associated with a screening delay. In some embodiments, the processing cost and the screening cost are significant to degrade the payor experience in rendering electronic payments to the beneficiary. Moreover, the financial institution incurs significant utilization of computer resources (e.g., processor capacity and memory capacity) in performing screenings for each electronic payment rendered to the beneficiary. Thus, one or more embodiments include generating a token price associated in rendering electronic payment between the payor and the beneficiary based on the processing cost and the screening cost. In some embodiments, the token price can be less than the sum of the processing cost and the screening cost. Further, the payor is provided a token service by the financial institution in which, if enrolled by the payor, the payor pays the token price as the enrollment fee. After enrolling in the token service, the financial institution provides screening of electronic payments from the payor to the beneficiary off-line (not in real-time) periodically (e.g., monthly, quarterly, etc.) such that no screening delay is incurred in rendering electronic payments between the payor and beneficiary in real-time.

In one or more embodiments, in system 300, the financial institution server 100*c* can generate a token price for the token service based on the processing cost and the screening cost. Further, the financial institution server 100*c* can provide a notification 300*a*-1 to enroll in the token service that includes the token price compared to the processing cost and the screening cost. Notification 300*a*-2 is provided via communication network 100*b* to communication device 100*a* utilizing the financial software application and presented to payor personnel on the display of communication device 100*a*. In addition, payor personnel can select to enroll in the token service and provide the selection 300*b*-1 of paying the token price and enrolling in the token service to the financial institution server 100*c*. Also, the financial institution server 100*c* receives the selection 300*b*-2 via communication network 100*b*.

Figure 3B:
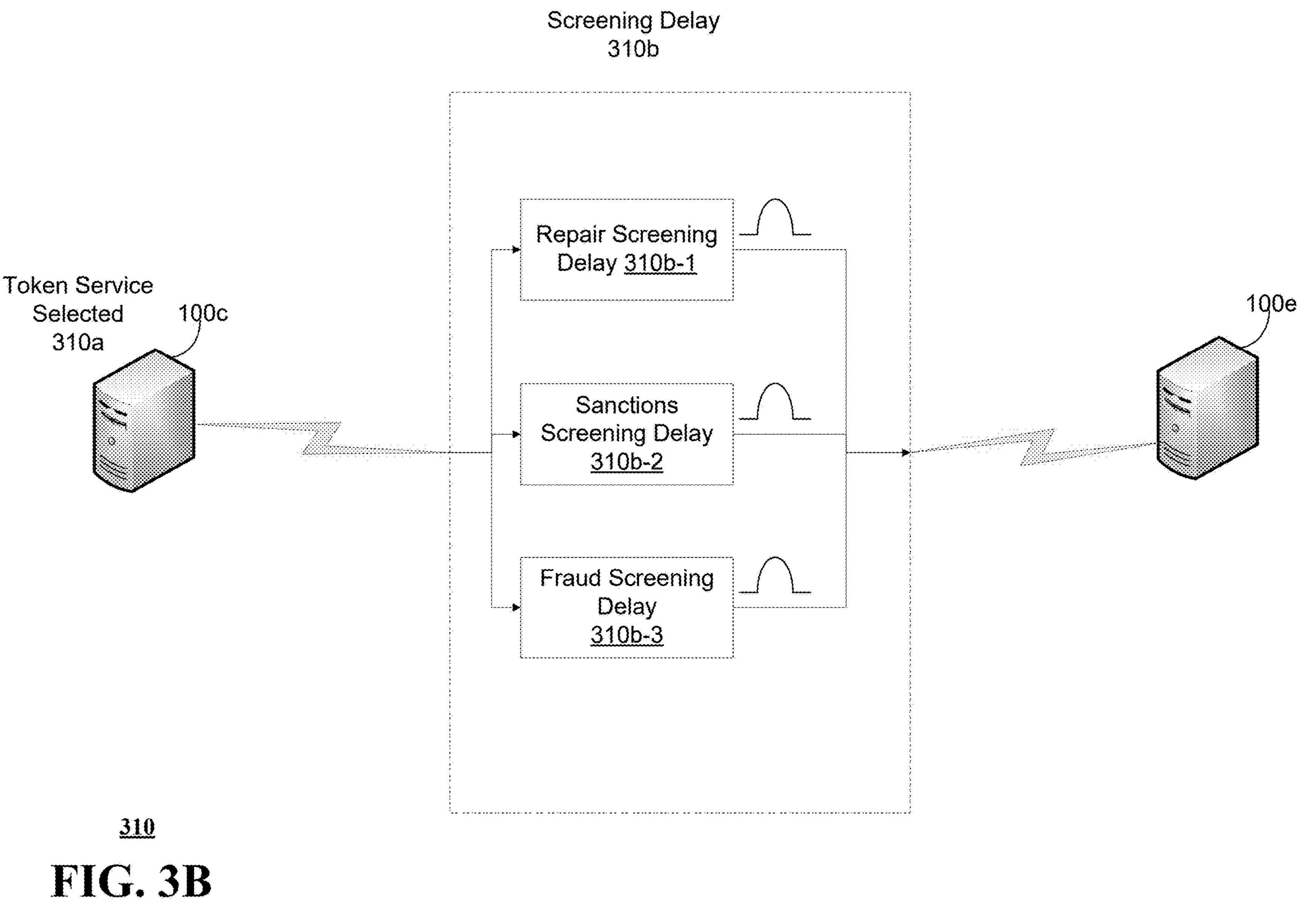

Referring to FIG. 3B, in one or more embodiments, system 310 illustrates that the payor has selected to enroll into the token service 310*a*. In response to the enrollment, the financial institution server 100*c* can conduct screening of the beneficiary offline, prior to rendering any electronic payment to the beneficiary server 100*e* to avoid any screening delay in real time. Screening can cause a screening delay 310*b* including a repair screening delay 310*b*-1, sanctions screening delay 310*b*-2, and fraud screening delay 310*b*-3. Offline screenings can be performed monthly, quarterly, etc. after enrolling into the token service.

Figure 3C:
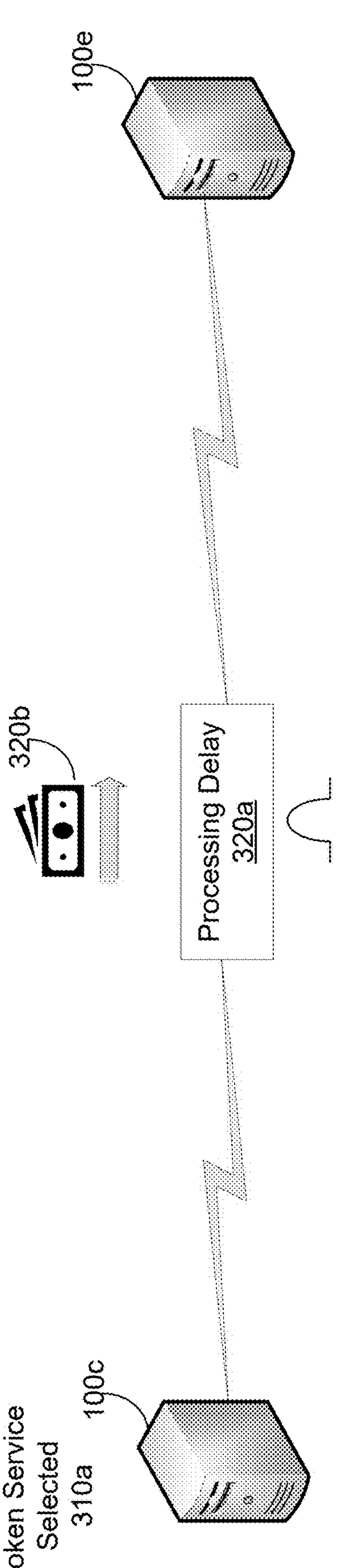

Referring to FIG. 3C, in one or more embodiments, system 320 illustrates rendering electronic payment 320*b* between payor and beneficiary after enrolling into the token service 310*a*. The financial institution server 100*c* can operate a financial account associated with the payor and the beneficiary server 100*e* can operate a financial account associated with the beneficiary. Rendering electronic payment 320*b* from a financial account of the payor by the financial institution server 100*c* to a financial account of the beneficiary can include incurring processing delay 320*a* but does not include incurring any screening delay.

Figure 4:
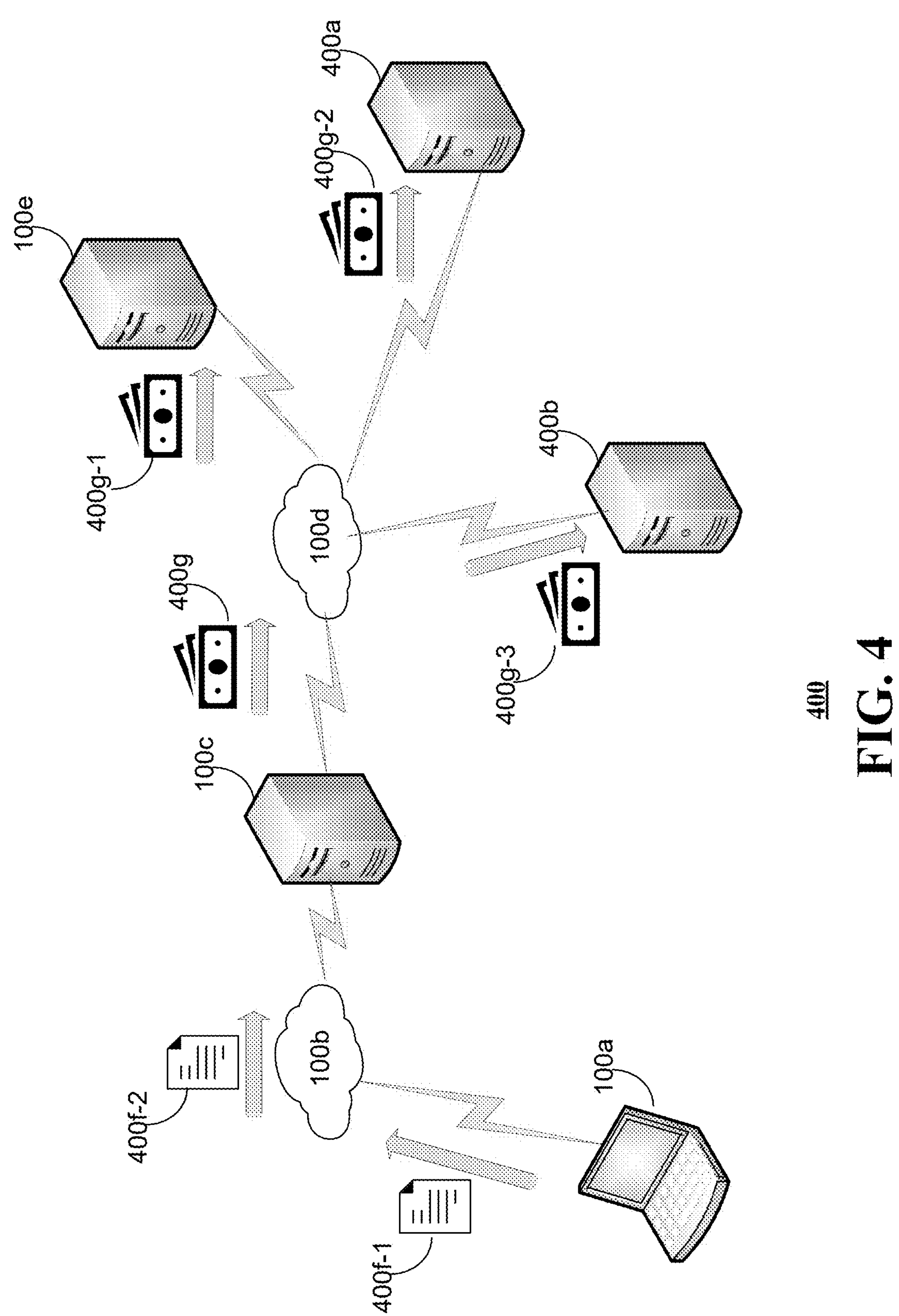

Referring to FIG. 4, in one or more embodiments, system 400 illustrates a payor enrolling into a token service to render electronic payments to multiple beneficiaries. That is, payor personnel provide electronic payment instructions 400*f*-1 to render electronic payments to three beneficiaries utilizing a financial software application on communication device 100*a*. Further, financial institution server 100*c* can receive the electronic payment instructions 400*f*-2 via communication network 100*b*. Based on the electronic payment instructions 400*f*-2, the financial institution server 100*c* can render electronic payments 400*g* from a financial account of the payor to a financial account associated with each beneficiary. The financial institution server 100*c* can operate a financial account associated with the payor and the first beneficiary server 100*e*, second beneficiary server 400*a*, and third beneficiary server 400*b* can each operate a financial account associated with each respective beneficiary. Specifically, the financial institution server 100*c* renders electronic payment 400*g*-1 over communication network 100*d* to a first beneficiary server 100*e* associated with a first beneficiary, the financial institution server 100*c* renders electronic payment 400*g*-2 to a second beneficiary server 400*a* associated with a second beneficiary, and the financial institution server 100*c* renders electronic payment 400*g*-3 to a third beneficiary server 400*b* associated with a third beneficiary. Further, the financial institutional server 100*c* incurs processing delays for rendering electronic payments 400*g* but does not conduct any screenings to incur screening delays associated with rendering electronic payments 400*g* because the payor's enrollment into the token service. Moreover, prior to rendering electronic payments 400*g*, financial institution server 100*e* can conduct screenings associated with each of the first beneficiary, the second beneficiary, and the third beneficiary offline.

In one or more embodiments, the financial institution server 100*c* can determine a token price for rendering electronic payments for each beneficiary, which can increase the gain (e.g., income) for the financial institution. However, this can be a burden to the payor as to decide to enroll in the token service for rendering electronic payments for each of its beneficiaries. Thus, the financial institution server 100*c* can determine a token price for rendering electronic payments from the payor to all of its beneficiaries that is a trade-off between maximizing the financial institution's gain and the burden for the payor to decide to enroll into the token service.

One or more embodiments can calibrate/generate the price of a token, which provides more efficient rendering of electronic payments that offers payors/clients the opportunity to circumvent the delay associated with routine screenings, while at the same time offsetting operating costs (e.g., more efficient use of financial institution computer resources) associated with screenings. Clients can be provided with the ability to enroll in the token for a token price (fee). Further embodiments determine this token price based on the clients' transaction/electronic payment transaction history. To enable this capability, the key decisions to model are (i) whether the client enrolls, which for the initial formulation, is conceptualized as being for a single client-beneficiary link, and (ii) the price set for the token, which is collected as a fee if the token service is set up for a client. In mathematical terms, there are two decision-makers modeled as:

Client: $X \in \{0,1\}$ is binary indicator of whether client enrolls in the token.

$C_{token} \geq 0$ is the nonnegative real-valued scalar price of the token, set by the financial institution.

These decisions are dependent on several attributes that are a function of a client-beneficiary electronic payments data, i.e., collection of transactions, over a time-horizon, which can subsequently referred to as a token span.

The characteristics that define a collection of transactions:

Distribution of electronic payments $$\{T_i\}_{i=1}^{N},$$

which depends both on the relative frequencies of electronic payments undergoing different screening types, in the form a probability mass function $p_j$ with $$\sum_{j=1}^{k} p_j = 1$$

and, e.g., the mean $\mu_j$ and variance $\sigma_j$ of the different electronic payment screening types;

$C_j$ denotes the cost incurred to the financial institution of electronic payment screening type j=1, . . . , k. $C_{pp}$ quantifies the electronic payment processing fee, and K is an operating cost associated with balance-check screenings;

$\tilde{C}_j$ is the cost incurred to the financial for a routine screening when client is enrolled, distinct from the cost derived from historical data associated when client is not enrolled in token. In general, $\tilde{C}_j=\check{p}_j C_j$ where $C_j$ denotes only labor costs, $C_{infr/lic}$ is infrastructure and licensing costs, and $\check{p}_j$ some the screening likelihood. According to the business, Repair Screening has null weight: $\check{p}_j=0$. Moreover, in the case of fraud, $\check{p}_j$ is derived from the Beneficiary Trust score. In the case of sanctions, $\check{p}_j=0$ for within US client-beneficiary pairs.

$u(T_i; \alpha, \beta)$ is the client utility, which is hypothesized to be small when the delay is large, and large when the processing delay is small.

$F_j$ is the screening frequency of screening type j when client is enrolled.

To formalize the performance metrics for making a token service available to the client, consider the case where there are N total electronic payments in a token span with an associated set of indices $\mathcal{N}$, which are comprised of (possibly overlapping) subsets $\mathcal{S}_j$ of electronic payments which undergo screenings of type j, i.e., $\mathcal{N}=\cup_j \mathcal{S}_j$ in a time interval. Define the following value functions for the firm and client, respectively, as:

On the financial institution side, define the objective function as the value to the financial institution:

$$\hat{V}(C_{token}) = N\cdot(C_{pp}-K) + X\cdot\left(C_{token} - \sum_{j=1}^{k}\frac{D}{F_j}*\tilde{C}_j + C_{infr/lic}\right) - (1-X)\cdot\left(\sum_{j=1}^{k}\sum_{k\in\mathcal{S}_j} C_j + C_{infr/lic}\right)$$

where first terms fixed operational costs that are independent of the token enrollment decision, the second one is the difference between the token price and the operational costs when the client does enroll, multiplied by the client's decision X, and the last term is the cumulative screening costs when the client does not enroll, multiplied by the negation of the client's decision (1−X).

On the client side, the enrollment decision is a function of client time savings, which can be quantified under the client utility model we have hypothesized. Aggregate this notion of savings over a batch of electronic payment transaction data to define the value to a client as:

$$\hat{U}(X) =$$

-continued $$-N\cdot C_{pp} + X\cdot(-C_{token} + N*u(T_0;\alpha,\beta)) + (1-X)\cdot\sum_{i=1}^{N} u(T_i;\alpha,\beta),$$

which is the sum of the fixed utility of routine screenings (first term), the utility associated with fixed-length delays when the client is enrolled multiplied by the client's decision X (second term), and the utility associated with routine delays due to screenings when the client does not enroll multiplied by the negation of the client's decision (1−X).

Observe that these objective functions depend on realizations of random variables $$\{T_i\}_{i=1}^{N}$$

as well as the relative breakdown of screening types $\mathcal{N}=\cup_j \mathcal{S}_j$ which are unknown in actuality, and can only be evaluated based on data. In particular, under a hypothesis that data are independent and identically drawn samples from a stationary distribution, the true objectives are $V(C_{token})=\mathbb{E}[\hat{V}(C_{token})]$ and $U(X)=\mathbb{E}[\hat{U}(X)]$, respectively.

From the perspective of the financial institution, assume that the price is fixed at the time in which a client makes the decision of whether to enroll. Therefore, this may be posed as a bilevel stochastic program of the form, where it can be reinterpreted $U(X)=U(X, C_{token})$ as a function of the token price.

$$\max_X U(X, C^*_{token})$$
$$\text{s.t. } C^*_{token} = \operatorname{argmax} V(C_{token})$$

This formulation does not yet constitute a reinforcement learning (RL) problem, as it does not consider that there is a state of the client or the financial institution, and the actions of both are a fixed deterministic quantity. However, when considering that the client decision may be the result of a randomized policy, or otherwise is state-dependent, and make a similar modelling hypothesis on the side of the financial institution, then this becomes a bilevel (RL) problem. Further define the gain as $$J(C_{token}) = \begin{cases} C_{token} - \sum_{j=1}^{k}\frac{D}{F_j}*\tilde{C}_j + E\left[\sum_{i=1}^{N}\sum_{j=1}^{k} 1\{\text{Payment } i \text{ is Type } j\}*C_j\right], & X=1 \\ 0, & X=0 \end{cases}$$

which is the token price (first term) plus the difference between the operating expenses with (the second term) and without the token (the last term). With these quantities specified, it can detail how the key aspects of the price engine operates.

One or more embodiments can comprise utilizing one or more pricing methodologies to determine the token price that include projected maximum price, block box optimization, reinforcement learning approach, and conservative offsets.

In one or more embodiments, a token price methodology utilizing projected maximum price can include the following:

Assume client has some cumulative utility associated with expedited electronic payment processing. That is, client utility is large for small delay, and small for large delay, aggregated over a time interval. Further, the financial institution gain as cost reduction associated with reduced number of screenings can be shown as Fin Inst Gain=Processing fees+Token fees+Screening Costs without Token−Screening costs with token Set token price as maximum value such that client cumulative utility $\hat{U}(X)$ is larger when enrolled:

Token price=(Average #Payments)*Utility of processing time with token−Sum(Utility of each payment when undergoing routine screenings)

Thus, client decision is to enroll in token:

Price $C_{token}$ is maximum such that client enrolls $\hat{U}(X=1)>\hat{U}(X=0)$ However, in such a pricing methodology there is no optimization of gain.

Instead, price is meant to yield reduction operating costs associated with screening delays.

In one or more embodiments, a token price methodology utilizing black box optimization can include the following:

Consider an initial token price $\tilde{C}$. Then evaluate $\nabla\hat{V}(\tilde{C})$ and use it to conduct gradient ascent, where $\hat{V}$ denotes the sample average approximation of the financial institution value ($V(C_{token})=\mathbb{E}[\hat{V}(C_{token})]$). However, $\nabla\tilde{V}(\tilde{C})=X$, which is integer-valued in X, so it cannot be used as it is non-differentiable in X. Instead, approximate $\nabla\hat{V}(\tilde{C})$ by finite-differences, i.e., black box:

$$\tilde{\nabla}\hat{V}(\tilde{C})=\frac{\hat{V}(\tilde{C}+\delta)-\hat{V}(\tilde{C})}{\delta}$$

(i) There are various enhancements to this approach. However, the essential version is to sample whether a client enrolls at a given price $\tilde{C}$ for a given electronic payments data set, i.e., to sample the realization of X for given token price $\tilde{C}$ by estimating $\hat{U}(X)$ which is based on the simple rule for client enrollment, which is $\mathbb{I}\{\mathbb{E}[\hat{U}(X=1)]>\mathbb{E}[\hat{U}(X=0)]\}$, where $\mathbb{I}\{\bullet\}$ denotes the indicator function. Then, sequentially execute policy updates according to the following, with step-size $\eta>0$ and initialization $C_0=\tilde{C}$:

$$C_{k+1}=C_k+\eta\tilde{\nabla}\hat{V}(C_k)$$

where k counts the number of iterations. Typically, this approach can be run for some total number of iterations K based on a stopping criterion: $|\tilde{\nabla}\hat{V}(C_k)|<\varepsilon$ where $\varepsilon$ is a tolerance parameter. This basic version is called black box optimization by finite-difference gradient estimates.

(ii) The smoothed enhancement of this strategy is to revise the update direction as follows $\tilde{\nabla}\hat{V}(C_k)$: starting from price $C_k$ at step k: sample D realizations from a Gaussian of the form $s_d\sim N(0,1)$ and consider the D-dimensional vector consisting of entries $\hat{V}(C_k+s_d\delta)$. The smoothed black box gradient estimator can be calculated by computing the inner-product between this vector and $d_s$, scaled by the Gaussian density:

$$\tilde{\nabla}\hat{V}(C_k)=\sum_{d=1}^{D}\left(\hat{V}(C_k+s_d\delta)-\hat{V}(C_k)\right)s_d\varphi(s_d)$$

In one or more embodiments, a token price methodology utilizing a reinforcement learning approach, which can include the following:

The token price can be modeled as a Markov game with a horizon T=1. Consider two types of agent, a financial institution agent and a client agent. In every episode, the financial institution agent first sets a price, and then the client agents decide to enroll or not. Depending on the client agents' enrollment status, the financial institution agent will receive a reward r, and the episode terminates. The objective of the financial institution agent is to set a price that maximizes the expected return E[r]. Note that the horizon T=1 is actually with respect to the valid month period associated with the token. State space: Expected number of transactions, $\lambda$; Processing time distribution for each screening type, $T_j\sim N(\mu_j, \sigma_j)$, where $j\in\{0$: BalanceCheck, 1: Repairs, 2: Sanctions, 3: Fraud$\}$; The cost of a screening type $C_j$, where $j\in\{0,1,2,3\}$. Action space: financial institution agent: $A_{JPMC}=[0,\infty)$, representing the token price; Client agent's action is binary, 1 or 0, indicating whether enroll or not.

The financial institution agent's observation (which for now is identical to the state) is:

$$o_{JPMC}=\{\lambda,\mu_0,\sigma_0,\mu_1,\sigma_1,\mu_2,\sigma_2,\mu_3,\sigma_3,c_1,c_2,c_3,p_1,p_2,p_3\},$$

and it learns a policy $\pi_\theta$: $O_{JPMC}\rightarrow A_{JPMC}$ to set a price which depends on a vector of d parameters $\theta\in\mathbb{R}^d$. Similar to the black box approach, it can be hypothesized that the client decides whether to enroll according to the threshold condition:

$$X=\begin{cases}1, & \hat{U}(X=1)>\hat{U}(X=0)\\ 0, & \hat{U}(X=1)\leq\hat{U}(X=0)\end{cases},$$

Reward function for financial institution is defined as above $\hat{V}(C_{token})$, and the gain is $J(C_{token})$. The key difference between the reinforcement learning approach, specifically, "soft actor-critic," and the black box approach is that: (i) the reinforcement learning approach allows policy parameterizations $\pi_\theta$ in terms of parameters $\theta$ and observations regarding link characteristics $o_{JPMC}$. The policy is updated in terms of gradient steps of $\hat{V}(C_{token})$ with respect to $\theta$ using a Policy Gradient, rather than a scalar-valued gradient iteration; (ii) a statistical model for the reward accumulated, i.e., $$\sum_{h=1}^{H}\hat{V}(C_{token})$$

over a time horizon of H episodes based on target-valued regression is considered, called a critic, in terms of parameters $\omega\in\mathbb{R}^p$, which is updated on a faster horizon than the policy; and (iii) To improve numerical stability, a replay buffer is used, which collects trajectories of observation-action-reward triples into a batch of data for a fixed policy. Then, data is sampled from this buffer periodically to execute critical updates and gradient iterations. These parts, taken together, are a methodology called soft actor-critic.

In one or more embodiments, a token price methodology utilizing conservative projected maximum price can include the following:

Define the breakeven price as the minimum price with positive gain: $C_{min}=\min_{C_{token}} \text{Gain}>0$. Define the Lower-Confidence Bound (LCB) associated with the projected max token price as follows: (a) For N batches of electronic payments data, evaluate difference of client utilities between enroll/unenroll: $\hat{U}(X=1)-\hat{U}(X=0)$; (b) Compute the standard deviation $\sigma$ of resultant list, which gives notion of price spread; (c) Define the conservative projected max in terms of the LCB, i.e., $C_{LCB}=C_{max}-\eta\sigma$, where $\eta=1, 2, 3, \ldots$; (d) Return the maximum of $C_{LCB}$ and $C_{min}$.

The resultant output can be called the Conservative Projected Maximum (CPM) Price, which can depend on conservatism parameter $\eta$: larger $\eta$ means more conservative. This approach calibrates the price to the following data-driven benchmarks: Breakeven point where the price yields reduction in operating costs of screenings; and Volatility associated of client enrollment decision interaction with transactions data and screenings for a fixed model of client behavior.

Referring to FIG. 8, chart 800 illustrates aspects of different token pricing methodologies. Specifically comparing the projected maximum pricing methodology with different conservative projected maximum methodologies.

Figure 5:
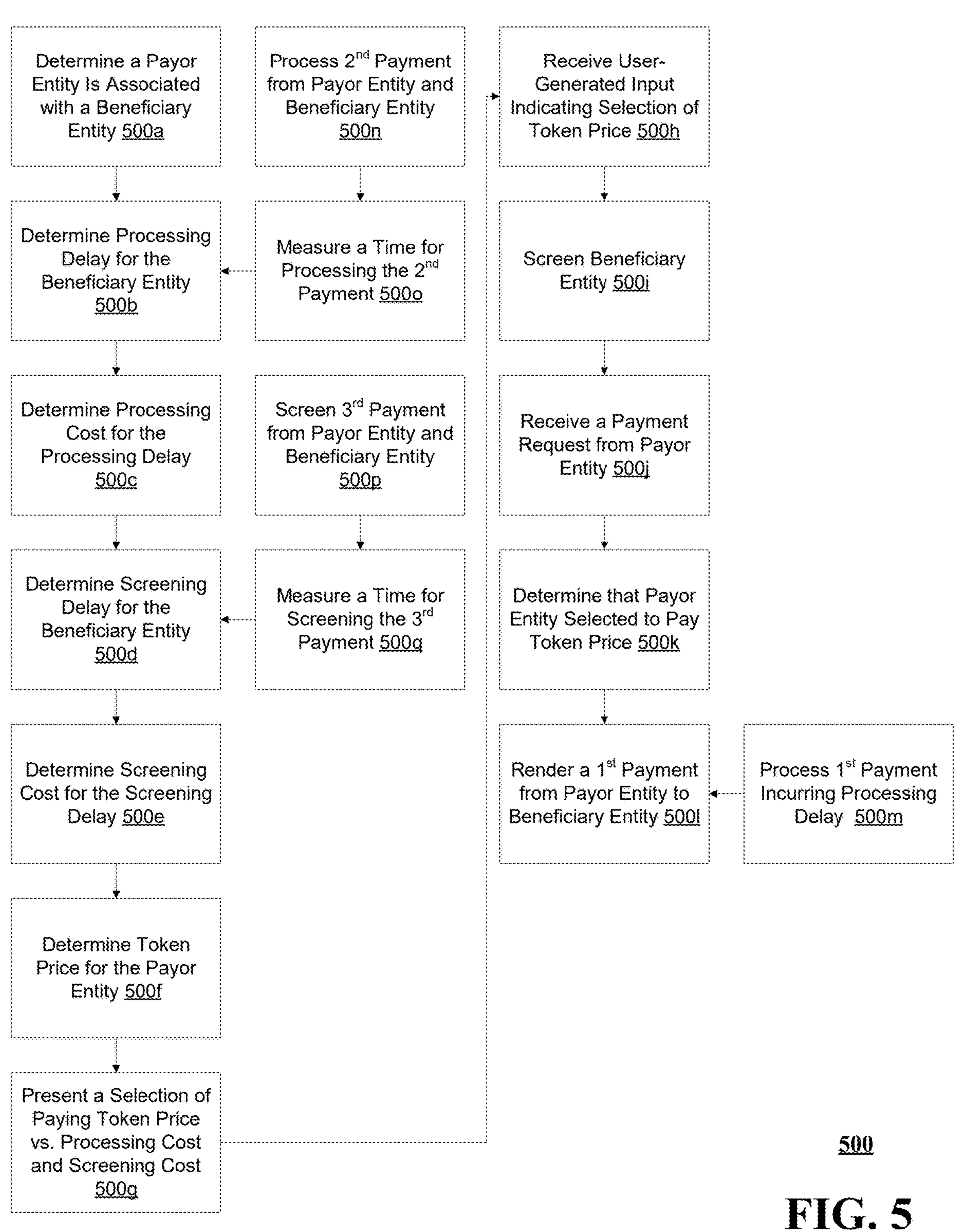
FIGS. 5, 6A and 6B depict illustrative embodiments of methods in accordance with various aspects described herein.

FIGS. 5 and 6 depict illustrative embodiments of a method in accordance with various aspects described herein.

Referring to FIG. 5, in one or more embodiments, the method 500 can be implemented by a financial institution server. The method 500 can include the financial institution server, at 500*a*, determining a payor entity is associated with a beneficiary entity based on an electronic payment transaction history associated with the payor entity. Further, the method 500 can include the financial institution server, at 500*b*, determining a processing delay for the beneficiary entity based on the electronic payment transaction history. In addition, the method 500 can include the financial institution server, at 500*c*, determining a processing cost for the processing delay based on the electronic payment transaction history. Also, the method 500 can include the financial institution server, at 500*d*, determining a screening delay for the beneficiary entity based on the electronic payment transaction history. Further, the method 500 can include the financial institution server, at 500*e*, determining a screening cost for the screening delay based on the electronic payment transaction history. In addition, the method 500 can include the financial institution server, at 500*f*, determining a token price for the payor entity based on the processing cost and the screening cost.

In one or more embodiments, the method 500 can include the financial institution server, at 500*g*, transmitting a notification over a communication network to a communication device associated with the payor entity, the notification includes presenting a selection of paying the token price compared to the processing cost and the screening cost, thereby enrolling in a token service. Further, the method 500 can include the financial institution server, at 500*h*, receiving user-generated input, over the communication network, from the communication device indicating that the payor entity selecting to pay the token price and enrolling in the token service. In addition, the method 500 can include the financial institution server, at 500*i*, screening the beneficiary entity after receiving the user-generated input and prior to receiving the electronic payment request. Also, the method 500 can include the financial institution server, at 500*j*, receiving an electronic payment request from communication device over the communication network to render electronic payment to the beneficiary entity. Further, the method 500 can include the financial institution server, at 500*k*, determining that the payor entity selected to pay the token price and enrolled into the token service resulting in a determination. In addition, the method 500 can include the financial institution server, at 500*l*, rendering, over the communication network, a first electronic payment from a financial account of the payor entity to a financial account of the beneficiary entity based on the determination.

In one or more embodiments, the method 500 can include the financial institution server, at 500*m*, processing the first electronic payment to include incurring the processing delay. Further, the method 500 can include the financial institution server rendering of the first electronic payment comprises rendering the first electronic payment without incurring the screening delay associated with the beneficiary entity. In other embodiments, the method 500 can include the financial institution server, at 500*n*, processing a second electronic payment from the payor entity and the beneficiary entity. Further, the method 500 can include the financial institution server, at 5000, measuring a time for processing the second electronic payment. In additional embodiments, the determining of the processor delay comprises processing a second electronic payment from the payor entity and the beneficiary entity; and measuring a time for processing the second electronic payment based on the electronic payment transaction history. In some embodiments, the method 500 can include the financial institution server, at 500*p*, screening a third electronic payment from the payor entity and the beneficiary entity. Also, the method 500 can include the financial institution server, at 500*q*, measuring a time for screening the third electronic payment based on the electronic payment transaction history. In additional embodiments, the determining the screening delay comprises screening a third electronic payment from the payor entity and the beneficiary entity, and measuring a time for screening the third electronic payment based on the electronic payment transaction history.

Figure 6A:
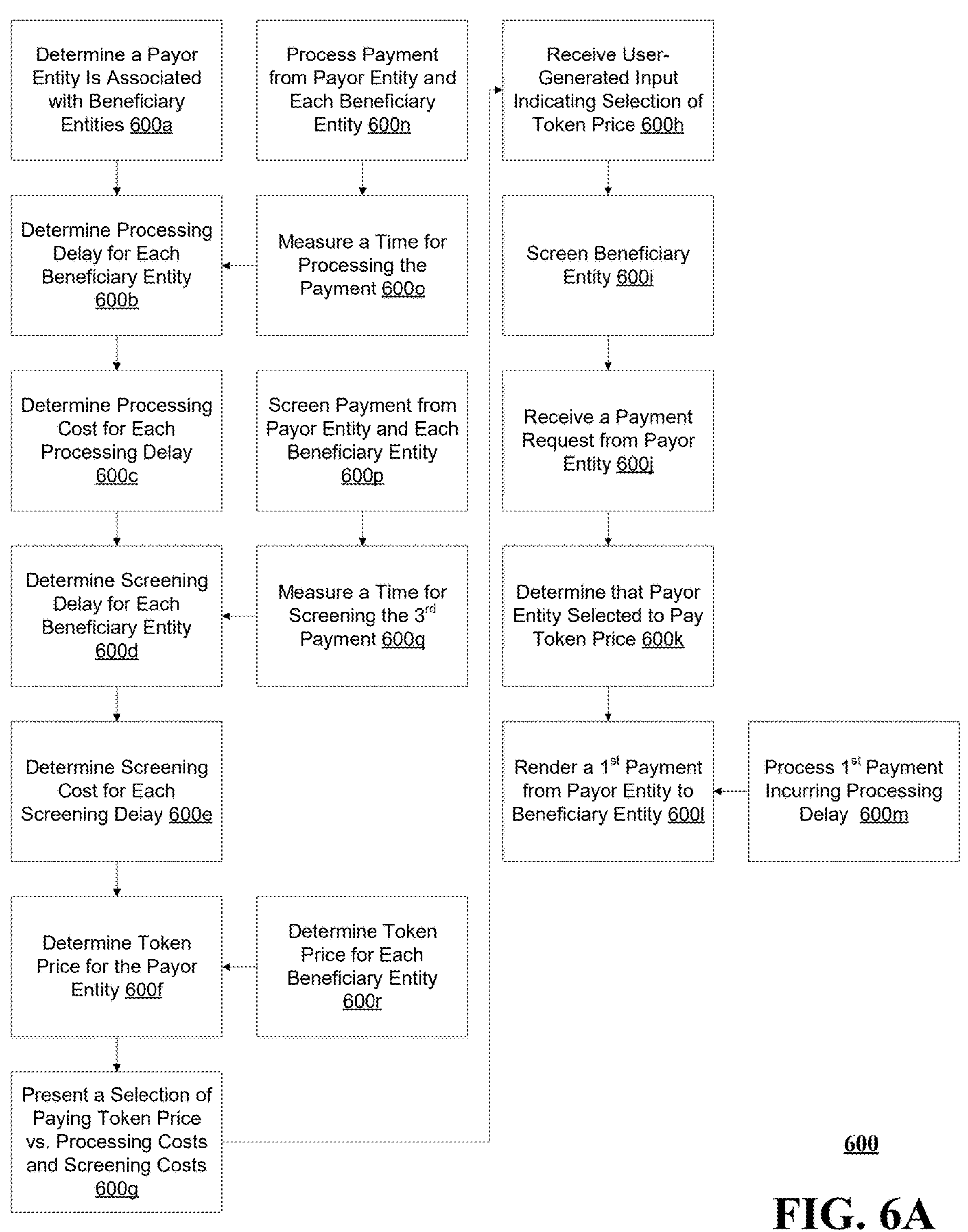

Referring to FIG. 6A, in one or more embodiments, the method 600 to render electronic payments to a group of beneficiaries can be implemented by a financial institution server. The method 600 can include the financial institution server, at 600*a*, determining a payor entity is associated with a group of beneficiary entities based on an electronic payment transaction history associated with the payor entity. Further, the method 600 can include the financial institution server, at 600*b*, determining a processing delay for each beneficiary entity of the group of beneficiary entities based on the electronic payment transaction history resulting in a group of processing delays. In addition, the method 600 can include the financial institution server, at 600*c*, determining a processing cost for each processing delay for the group of processing delays based on the electronic payment transaction history resulting in a group of processing costs. Also, the method 600 can include the financial institution server, at 600*d*, determining a screening delay for each beneficiary entity of the group of beneficiary entities based on the electronic payment transaction history resulting in a group of screening delays. Further, the method 600 can include the financial institution server, at 600*e*, determining a screening cost for each screening delay for the group of screening delays based on the electronic payment transaction history resulting in a group of screening costs. In addition, the method 600 can include the financial institution server, at 600*f*, determining a token price for the payor entity based on the group of processing costs and the group of screening costs. In some embodiments, the method 600 can include the financial institution server, at 600_r_, determining a token price for each beneficiary entity. In further embodiments, the determining of the token price for the payor entity comprises determining the token price for each beneficiary.

In one or more embodiments, the method 600 can include the financial institution server, at 600_g_, transmitting a notification over a communication network to a communication device associated with the payor entity, wherein the notification includes presenting a selection of paying the token price compared to the group of processing costs, and the group of screening costs, thereby enrolling in a token service. Further, the method 600 can include the financial institution server, at 600_h_, receiving user-generated input, over the communication network, from the communication device indicating that the payor entity selecting to pay the token price and enrolling in the token service. In addition, the method 600 can include the financial institution server, at 600_i_, screening the first beneficiary entity of the group of beneficiary entities after receiving the user-generated input and prior to receiving the electronic payment request. Also, the method 600 can include the financial institution server, at 600_j_, receiving an electronic payment request from the communication device over the communication network to render electronic payment to a first beneficiary entity of the group of beneficiary entities. Further, the method 600 can include the financial institution server, at 600_k_, determining that the payor entity selected to pay the token price and enrolled into the token service resulting in a determination. In addition, the method 600 can include the financial institution server, at 600_l_, rendering, over the communication network, electronic payment from a financial account of the payor entity to a financial account of the first beneficiary entity based on the determination.

In one or more embodiments, the method 600 can include the financial institution server, at 600_m_, processing the electronic payment to include incurring the processing delay. In some embodiments, the rendering of the electronic payment comprises rendering the electronic payment without incurring a first screening delay associated with the first beneficiary entity. Further, the method 600 can include the financial institution server rendering of the first electronic payment comprises rendering the first electronic payment without incurring the screening delay associated with the beneficiary entity. In other embodiments, the method 600 can include the financial institution server, at 600_n_, processing an electronic payment from the payor entity and each beneficiary entity. Further, the method 600 can include the financial institution server, at 6000, measuring a time for processing the electronic payment for each beneficiary electronic payment based on the electronic payment transaction history. In additional embodiments, the determining of the processor delay comprises processing an electronic payment from the payor entity and each beneficiary entity and measuring a time for processing the electronic payment electronic payment based on the electronic payment transaction history. In some embodiments, the method 600 can include the financial institution server, at 600_p_, screening an electronic payment from the payor entity and each beneficiary entity. Also, the method 600 can include the financial institution server, at 600_q_, measuring a time for screening each electronic payment electronic payment based on the electronic payment transaction history. In additional embodiments, the determining the screening delay comprises screening an electronic payment from the payor entity and the beneficiary entity, and measuring a time for screening the electronic payment electronic payment based on the electronic payment transaction history.

In one or more embodiments, the processing delay associated with each beneficiary entity of the group of beneficiary entities comprises a first delay associated with checking a balance of a financial account associated with the payor entity. In further embodiments, the screening delay for each beneficiary entity of the group of beneficiary entities comprises at least one of a fraud screening delay, a sanctions screening delay, and a repair screening delay. In additional embodiments the determining the token price comprises determining the token price utilizing a technique selected from the group of projected maximum price, black box optimization, reinforcement learning, and conservative offsets.

Figure 6B:
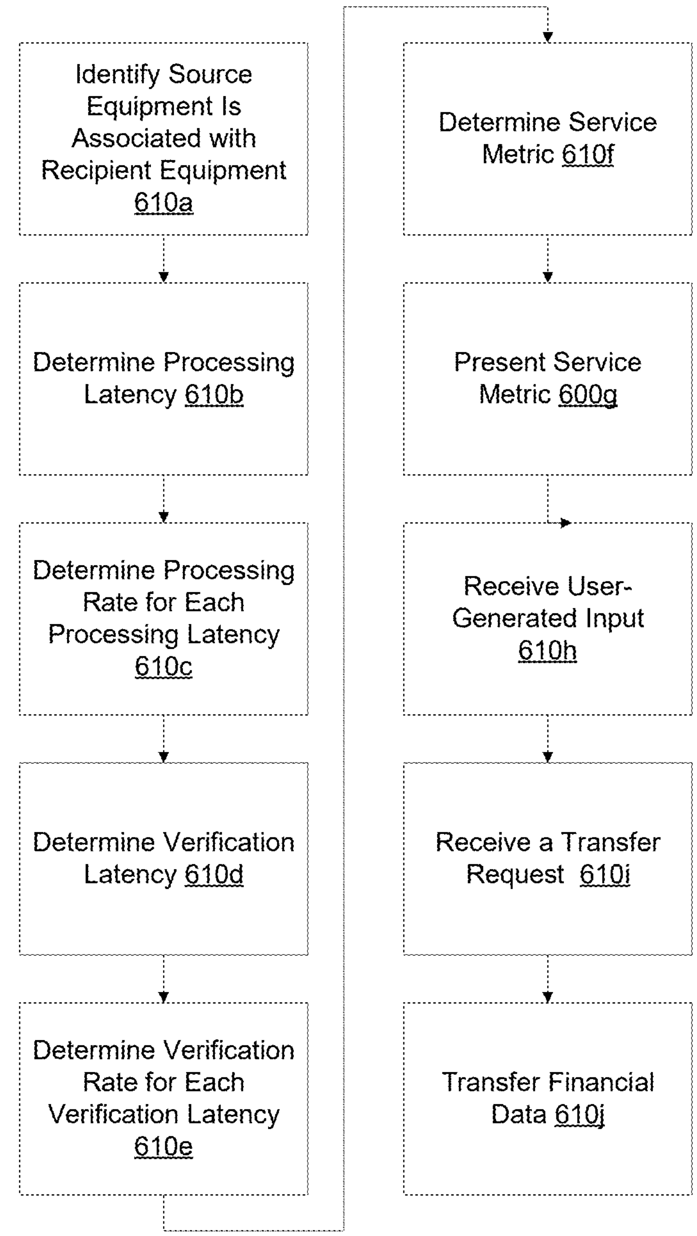

Referring to FIG. 6B, in one or more embodiments, the method 610 to transfer financial data to a group of receiving equipment, each associated with a beneficiary entity can be implemented by a financial institution server. The method 610 can include the financial institution server, at 610_a_, identifying source equipment is associated with a group of recipient equipment based on historical financial data exchanged between the source equipment and the group of recipient equipment. Further, the method 610 can include the financial institution server, at 610_b_, determining a processing latency between the source equipment and each recipient equipment of the group of recipient equipment based on the historical financial data resulting in a group of processing latencies. In addition, the method 610 can include the financial institution server, at 610_c_, determining a processing rate for each processing latency between the source equipment and each recipient equipment resulting in a group of processing rates. Also, the method 610 can include the financial institution server, at 610_d_, determining a verification latency to perform security authentication for each recipient equipment of the group of recipient equipment resulting in a group of verification latencies. Further, the method 610 can include the financial institution server, at 610_e_, determining a verification rate for each verification latency resulting in a group of verification rates. In addition, the method 610 can include the financial institution server, at 610_f_, determining a service metric based on the group of processing rates and the group of verification rates, the service metric being associated with a token service that expediates a transfer of financial data between the source equipment and the group of recipient equipment. Also, the method 610 can include the financial institution server, at 610_g_, presenting the service metric at the source equipment to enable enrollment of the source equipment to utilize the token service. In some embodiments, the presenting of the service metric comprises transmitting a notification over a communication network to the source equipment, wherein the notification includes presenting the service metric to enable enrollment of the source equipment to utilize the token service.

In one or more embodiments, the method 610 can include the financial institution server, at 610_h_, receiving user-generated input from the source equipment, over a communication network, indicating to enroll in the token service. Further, the method 610 can include the financial institution server, at 610_i_, receiving a request to transfer the financial data from the source equipment over a communication network. In addition, the method 610 can include the financial institution server, at 610_j_, transferring, over the communication network, the financial data to the recipient equipment over the communication network based on enrollment in the token service.

In one or more embodiments, the source equipment is associated with a payor entity, and each of the group of recipient equipment is associated with a beneficiary entity. In further embodiments, the transferring of financial data comprises rendering an electronic payment from a financial account of the payor entity to a financial account of the beneficiary entity. In other embodiments, each processing latency comprises a processing delay, each processing rate comprises a processing cost, each verification latency comprises a screening delay, and each verification rate comprises a screening cost. In some embodiments, the determining of the service metric based on the group of processing rates and the group of verification rates comprises determining a token price for the token service based on the processing delay, processing cost, screening delay, and screening cost. In further embodiments, the determining of the token price comprises determining the token price utilizing a technique selected from the group of projected maximum price, black box optimization, reinforcement learning, and conservative offsets. In additional embodiments, security authentication can comprise screening a beneficiary entity prior to rendering electronic payment to the beneficiary entity.

While for purposes of simplicity of explanation, the respective processes are shown and described as a series of blocks in FIGS. 5, 6A, and 6B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. One or more blocks in FIGS. 5-6 can be performed in response to one or more blocks in FIGS. 5-6.

Portions of some embodiments can be combined with portions of other embodiments.

Figure 7:
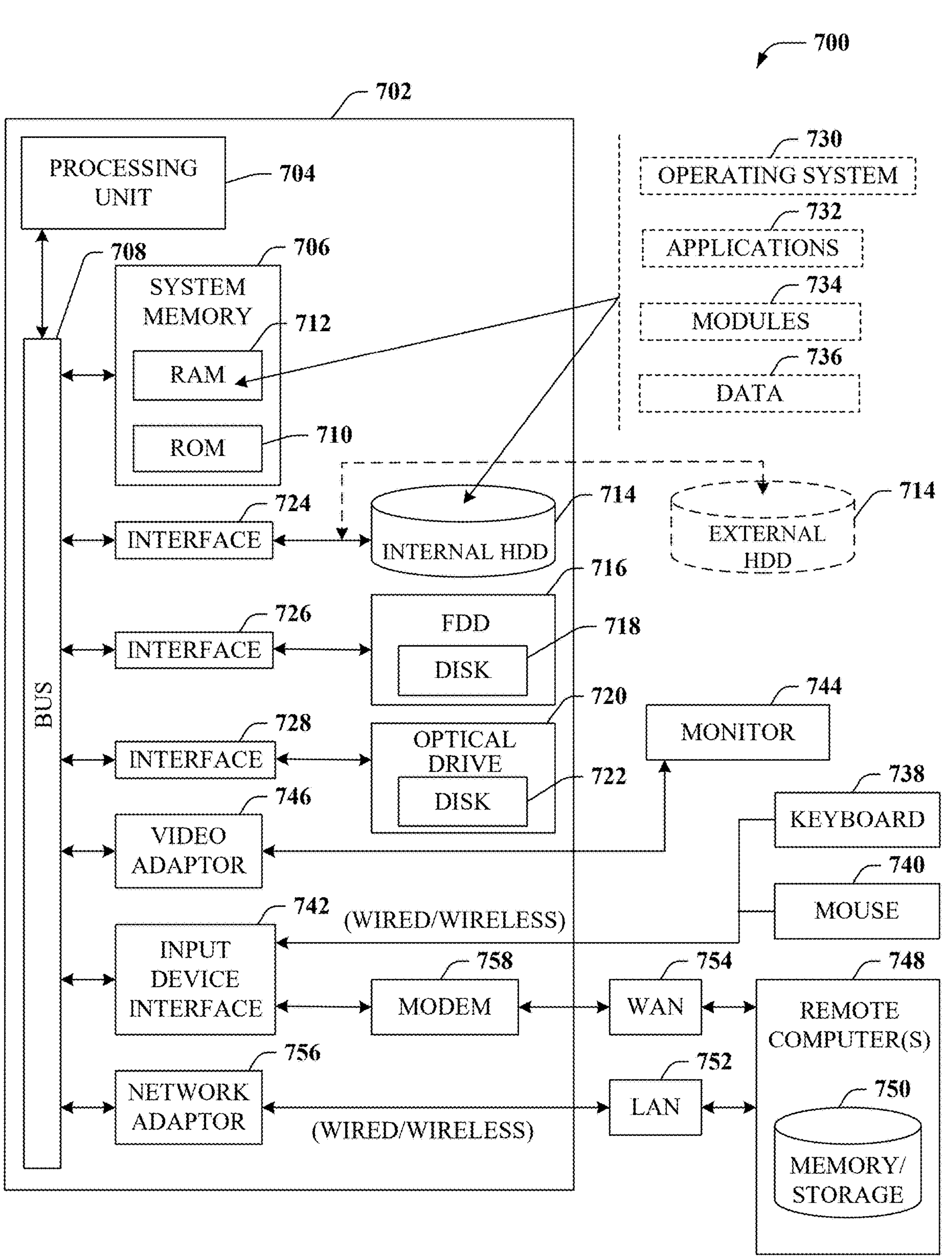
FIG. 7 is a block diagram of an example, non-limiting embodiment of a computing environment in accordance with various aspects described herein.

Turning now to FIG. 7, there is illustrated a block diagram of a computing environment in accordance with various aspects described herein. In order to provide additional context for various embodiments of the embodiments described herein, FIG. 7 and the following discussion are intended to provide a brief, general description of a suitable computing environment 700 in which the various embodiments of the subject disclosure can be implemented. For example, computing environment 700 can facilitate in whole or in part facilitating rendering of electronic payments from a payor to a beneficiary. Further, each of communication device 100*a*, financial institution server 100*c*, beneficiary server 100*e*, beneficiary server 400*a*, and beneficiary server 400*b* comprise computing environment 700.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 7, the example environment can comprise a computer 702, the computer 702 comprising a processing unit 704, a system memory 706 and a system bus 708. The system bus 708 couples system components including, but not limited to, the system memory 706 to the processing unit 704. The processing unit 704 can be any of various commercially available processors. Dual microprocessors and other multiprocessor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 comprises ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also comprise a high-speed RAM such as static RAM for caching data.

The computer 702 further comprises an internal hard disk drive (HDD) 714 (e.g., EIDE, SATA), which internal HDD 714 can also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high-capacity optical media such as the DVD). The HDD 714, magnetic FDD 716 and optical disk drive 720 can be connected to the system bus 708 by a hard disk drive interface 724, a magnetic disk drive interface 726 and an optical drive interface 728, respectively. The hard disk drive interface 724 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 712, comprising an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

A user can enter commands and information into the computer 702 through one or more wired/wireless input devices, e.g., a keyboard 738 and a pointing device, such as a mouse 740. Other input devices (not shown) can comprise a microphone, an infrared (IR) remote control, a joystick, a game pad, a stylus pen, touch screen or the like. These and other input devices are often connected to the processing unit 704 through an input device interface 742 that can be coupled to the system bus 708, but can be connected by other interfaces, such as a parallel port, an IEEE 1394 serial port, a game port, a universal serial bus (USB) port, an IR interface, etc.

A monitor 744 or other type of display device can be also connected to the system bus 708 via an interface, such as a video adapter 746. It will also be appreciated that in alternative embodiments, a monitor 744 can also be any display device (e.g., another computer having a display, a smart phone, a tablet computer, etc.) for receiving display information associated with computer 702 via any communication means, including via the Internet and cloud-based networks. In addition to the monitor 744, a computer typically comprises other peripheral output devices (not shown), such as speakers, printers, etc.

The computer 702 can operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically comprises many or all of the elements described relative to the computer 702, although, for purposes of brevity, only a remote memory/storage device 750 is illustrated. The logical connections depicted comprise wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which can connect to a global communications network, e.g., the Internet.

When used in a LAN networking environment, the computer 702 can be connected to the LAN 752 through a wired and/or wireless communication network interface or adapter 756. The adapter 756 can facilitate wired or wireless communication to the LAN 752, which can also comprise a wireless AP disposed thereon for communicating with the adapter 756.

When used in a WAN networking environment, the computer 702 can comprise a modem 758 or can be connected to a communications server on the WAN 754 or has other means for establishing communications over the WAN 754, such as by way of the Internet. The modem 758, which can be internal or external and a wired or wireless device, can be connected to the system bus 708 via the input device interface 742. In a networked environment, program modules depicted relative to the computer 702 or portions thereof, can be stored in the remote memory/storage device 750. It will be appreciated that the network connections shown are example and other means of establishing a communications link between the computers can be used.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

based on the first instructions, exchanging the first financial data between the source equipment and the recipient equipment, wherein the exchanging of the first financial data comprises utilizing a first processor capacity associated with the processing system and a first memory capacity associated with the processing system, wherein the exchanging of the first financial data comprises incurring, by the processing system:

a processing latency based on verifying sufficient funds, checking a routing number and an account number, and rendering of a payment utilizing an electronic payment service;

and a verification latency based on checking sanctions associated with the rendering of the payment and checking fraud associated with a payor and a beneficiary associated with the rendering of the payment;

determining the processing latency between the source equipment and the recipient equipment based on the verifying of the sufficient funds, the checking of the routing number and of the account number, and the rendering of the payment utilizing an electronic payment service and based on the historical financial data;

determining a processing rate for the processing latency between the source equipment and the recipient equipment;

determining the verification latency to perform security authentication for the recipient equipment based on the checking sanctions associated with the rendering of the payment and the checking of the fraud associated with the payor and the beneficiary of the rendering of the payment;

determining a service metric based on the processing rate and the verification rate, the service metric being associated with a token service that expedites a transfer of financial data between the source equipment and the recipient equipment;

selecting a pricing methodology for the token service based on the service metric, wherein the service metric comprises one or more of token price, financial institution gain, and client time savings;

enrolling the source equipment to utilize the token service based on the service metric;

implementing the token service at periodic time intervals to mitigate the processing latency and the verification latency by processing and screening for groups of exchanging financial data rather than for each individual exchange of financial data, wherein the implementing of the token service comprises:

the verifying of the sufficient funds and the checking of the routing number and of the account number at the periodic time intervals; and the checking of the sanctions associated with the rendering of the payment and the checking of the fraud associated with the payor and the beneficiary of the rendering of the payment at the periodic time intervals;

based on the second instructions, exchanging second financial data between the source equipment and the recipient equipment utilizing the token service, wherein the exchanging of the second financial data comprises utilizing a second processor capacity associated with the processing system and a second memory capacity associated with the processing system, wherein the second processor capacity is less than the first processor capacity, wherein the second memory capacity is less than the first memory capacity, wherein the processing system utilizes less processor capacity and less memory capacity when exchanging the second financial data based on the implementing of the token service at the periodic time intervals prior to the exchanging of the second financial data as compared to the exchanging of the first financial data without utilizing the token service prior to the exchanging the first financial data, wherein the exchanging of the second financial data comprises rendering of the payment from the payor to the beneficiary and avoids the verifying of the sufficient funds and the checking of the routing number and of the account number, the checking of the sanctions associated with the rendering of the payment and the checking of the fraud associated with the payor and the beneficiary of the rendering of the payment.

2. The device of claim 1, wherein the operations comprise presenting the service metric at the source equipment to enable enrollment of the source equipment to utilize the token service wherein the presenting of the service metric comprises transmitting a notification over a communication network to the source equipment, wherein the notification includes presenting the service metric to enable enrollment of the source equipment to utilize the token service.

3. The device of claim 1, wherein the operations comprise receiving user-generated input from the source equipment, over a communication network, indicating to enroll in the token service.

4. The device of claim 1, wherein the operations comprise receiving a request to transfer third financial data from the source equipment over a communication network.

5. The device of claim 4, wherein the operations comprise transferring, over the communication network, the third financial data to the recipient equipment over the communication network based on enrollment in the token service.

6. The device of claim 5, wherein the source equipment is associated with a payor entity, wherein the recipient equipment is associated with a beneficiary entity.

7. The device of claim 6, wherein the transferring of the third financial data comprises rendering an electronic payment from a financial account of the payor entity to a financial account of the beneficiary entity.

8. The device of claim 1, wherein the processing latency comprises a processing delay, wherein the processing rate comprises a processing cost, wherein the verification latency comprises a screening delay, wherein the verification rate comprises a screening cost.

9. The device of claim 8, wherein the determining of the service metric based on the processing rate and the verification rate comprises determining a token price for the token service based on the processing delay, processing cost, screening delay, and screening cost.

10. The device of claim 9, wherein the determining of the token price comprises determining the token price utilizing the pricing methodology, wherein the pricing methodology is selected from a group of projected maximum price, black box optimization, reinforcement learning, and conservative offsets.

11. A non-transitory machine-readable medium, comprising executable instructions that, when executed by a processing system including a processor, facilitate performance of operations, the operations comprising:

identifying source equipment is associated with a recipient equipment based on historical financial data exchanged between the source equipment and the recipient equipment;

based on the first instructions, exchanging the first financial data between the source equipment and the recipient equipment, wherein the exchanging of the first financial data comprises utilizing a first processor capacity associated with the processing system and a first memory capacity associated with the processing system, wherein the exchanging of the first financial data comprises incurring, by the processing system:

a processing latency based on verifying sufficient funds, checking a routing number and an account number, and rendering of a payment utilizing an electronic payment service;

and a verification latency based on checking sanctions associated with the rendering of the payment and checking fraud associated with a payor and a beneficiary associated with the rendering of the payment;

determining a processing rate for the processing latency between the source equipment and the recipient equipment based on the verifying of the sufficient funds, the checking of the routing number and of the account number, and the rendering of the payment utilizing an electronic payment service;

determining a verification rate for a verification latency to perform security authentication for the recipient equipment based on the checking of the sanctions associated with the rendering of the payment and the checking of the fraud associated with the pavor and the beneficiary of the rendering of the payment;

determining a service metric based on the processing rate and the verification rate, the service metric being associated with a token service that expedites a transfer of financial data between the source equipment and the recipient equipment;

selecting a pricing methodology for the token service based on the service metric, wherein the service metrics comprise one or more of token price, financial institution gain, and client time savings;

implementing the token service at periodic time intervals to mitigate the processing latency and the verification latency by processing and screening group of exchanging financial data rather than for each individual exchange of financial data, wherein the implementing of the token service comprises:

the verifying of the sufficient funds and the checking of the routing number and of the account number at the periodic time intervals; and the checking of the sanctions associated with the rendering of the payment and the checking of the fraud associated with the payor and the beneficiary of the rendering of the payment at the periodic time intervals;

based on the second instructions, exchanging second financial data between the source equipment and the recipient equipment utilizing the token service, wherein the exchanging of the second financial data comprises utilizing a second processor capacity associated with the processing system and a second memory capacity associated with the processing system, wherein the second processor capacity is less than the first processor capacity, wherein the second memory capacity is less than first memory capacity, wherein the processing system utilizes less processor capacity and less memory capacity when exchanging the second financial data based on the implementing of the token service at the periodic time intervals prior to the exchanging of the second financial data as compared to the exchanging of the first financial data without utilizing the token service prior to the exchanging of the first financial data, wherein the exchanging of the second financial data comprises rendering of the payment from the payor to the beneficiary and avoids the verifying of the sufficient funds and the checking of the routing number of the account number, the checking of the sanctions associated with the rendering of the payment and the checking of the fraud associated with the payor and the beneficiary of the rendering of the payment.

12. The non-transitory machine-readable medium of claim 11, wherein operations comprise presenting the service metric at the source equipment to enable enrollment of the source equipment to utilize the token service when the presenting of the service metric comprises transmitting a notification over a communication network to the source equipment, wherein the notification includes presenting the service metric to enable enrollment of the source equipment to utilize the token service.

13. The non-transitory machine-readable medium of claim 12, wherein the operations comprise receiving user-generated input from the source equipment, over a communication network, indicating to enroll in the token service.

14. The non-transitory machine-readable medium of claim 11, wherein the operations comprise receiving a request to transfer third financial data from the source equipment over a communication network.

15. The non-transitory machine-readable medium of claim 14, wherein the operations comprise transferring, over the communication network, the third financial data to the recipient equipment over a communication network based on enrollment in the token service.

16. The non-transitory machine-readable medium of claim 15, wherein the source equipment is associated with a payor entity, wherein the recipient equipment is associated with a beneficiary entity.

17. The non-transitory machine-readable medium of claim 16, wherein the transfer of third financial data comprises rendering an electronic payment from a financial account of the payor entity to a financial account of the beneficiary entity.

18. The non-transitory machine-readable medium of claim 11, wherein the processing latency comprises a processing delay, wherein the processing rate comprises a processing cost, wherein the verification latency comprises a screening delay, wherein the verification rate comprises a screening cost.

19. The non-transitory machine-readable medium of claim 18, wherein the determining of the service metric based on the processing rate and the verification rate comprises determining a token price for the token service based on the processing delay, processing cost, screening delay, and screening cost.

20. A method comprising:

identifying, by a server including a processor, source equipment is associated with a recipient equipment based on historical financial data exchanged between the source equipment and the recipient equipment;

based on the first instructions, exchanging, by the server, the first financial data between the source equipment and the recipient equipment, wherein the exchanging of the first financial data comprises utilizing a first processor capacity associated with the server and a first memory capacity associated with the server, wherein the exchanging of the first financial data comprises incurring, by the server;

a processing latency based on verifying sufficient funds, checking a routing number and an account number, and rendering of a payment utilizing an electronic payment service; and a verification latency based on checking sanctions associated with the rendering of the payment and checking fraud associated with a payor and a beneficiary associated with the rendering of the payment;

determining, by the server, the processing latency between the source equipment and the recipient equipment based on the verifying of the sufficient funds, the checking of the routing number and of the account number, and the rendering of the payment utilizing an electronic payment service and based on the historical financial data;

determining, by the server, a verification latency to perform security authentication for the recipient equipment; determining, by the server, a verification rate;

determining, by the server, a service metric based on the processing rate and the verification rate, the service metric being associated with a token service that expediates a transfer of financial data between the source equipment and the recipient equipment;

selecting, by the server, a pricing methodology for the token service based on the service metric, wherein the service metric comprises one or more of token price, financial institution gain, and client time savings;

enrolling, by the server, the source equipment to utilize the token service based on the service metric; implementing, by the server, the token service at periodic time intervals to mitigate the processing latency and the verification latency by processing and screening for groups of exchanging financial data rather than for each individual exchange of financial data, wherein the implementing of the token service comprises:

the verifying of the sufficient funds and the checking of the routing number and of the account number at the periodic time intervals, and the checking of the sanctions associated with the rendering of the payment and the checking of the fraud associated with the payor and the beneficiary of the rendering of the payment at the periodic time intervals;

receiving, by the server, second instructions to exchange second financial data between the source equipment and the recipient equipment utilizing the token service; and based on the second instructions, exchanging, by the server, second financial data between the source equipment and the recipient equipment utilizing the token service, wherein the exchanging of the second financial data comprises utilizing a second processor capacity associated with the server and a second memory capacity associated with the server, wherein the second processor capacity is less than the first processor capacity, wherein the second memory capacity is less than the first memory capacity wherein the server utilizes less processor capacity and less memory capacity when exchanging the second financial data based on the implementing of the token service at the periodic time intervals prior to the exchanging of the second financial data as compared to the exchanging of the first financial data without utilizing the token service prior to the exchanging the first financial data, wherein the exchanging of the second financial data comprises rendering payment from the payor to the beneficiary and avoids the verifying of the sufficient funds and the checking of the routing number and of the account number, the checking of the sanctions associated with the rendering of the payment and the checking of the fraud associated with the payor and the beneficiary of the rendering of the payment.

* * * * *